United States Patent [19]

Parker

[11] 4,204,019
[45] May 20, 1980

[54] POLYISOCYANURATE FOAM LAMINATE AND PROCESS

[75] Inventor: Lawrence J. Parker, Converse, Tex.

[73] Assignee: Shelter Insulation, Inc., San Antonio, Tex.

[21] Appl. No.: 941,057

[22] Filed: Sep. 11, 1978

[51] Int. Cl.² .................. B32B 3/26; B32B 5/20; B32B 31/14
[52] U.S. Cl. .................. 428/310; 156/79; 428/313; 428/314; 428/315; 428/422.8; 521/902
[58] Field of Search .................. 521/902; 156/79; 428/310, 313, 315, 425, 423, 424, 314

[56] References Cited

U.S. PATENT DOCUMENTS

| | | | |
|---|---|---|---|
| 2,866,730 | 12/1958 | Potchen et al. | 428/159 |
| 3,453,168 | 7/1969 | Edwards et al. | 428/425 |
| 3,644,232 | 2/1972 | Bernard et al. | 521/902 |
| 3,874,980 | 4/1975 | Richards et al. | 428/425 |
| 3,903,346 | 9/1975 | DeLeon et al. | 428/425 |
| 3,954,684 | 5/1976 | Farrissey, Jr. et al. | 521/902 |
| 3,960,788 | 6/1976 | Cuscurida et al. | 521/902 |
| 3,988,267 | 10/1976 | Bechara et al. | 521/902 |
| 3,993,652 | 11/1976 | Bechara et al. | 521/902 |
| 3,996,223 | 12/1976 | Gupta et al. | 521/902 |
| 3,998,766 | 12/1976 | Kan et al. | 521/902 |
| 4,003,859 | 1/1977 | Reymore, Jr. | 521/902 |
| 4,024,310 | 5/1977 | Wooler et al. | 428/313 |
| 4,025,687 | 5/1977 | Wooler et al. | 428/310 |
| 4,033,908 | 7/1977 | Hopkins, Jr. | 521/902 |
| 4,039,487 | 8/1977 | Kolakowski et al. | 521/902 |
| 4,040,992 | 8/1977 | Bechara et al. | 521/902 |
| 4,067,833 | 1/1978 | Austin et al. | 428/902 |
| 4,118,533 | 10/1978 | Hipchen et al. | 428/313 |

*Primary Examiner*—William J. Van Balen
*Attorney, Agent, or Firm*—Weiser, Stapler & Spivak

[57] ABSTRACT

A polyisocyanurate foam laminate produced by admixing a polyisocyanate component and a polyol component and coating the mixture between two flexible sheet substrates. The three-layered laminate is then passed between two substantially immovable barriers which restrict the expansion of the laminate caused by foaming of the reaction mixture as a result of the evaporation and entropment of a blowing agent within the polyisocyanurate closed cell structure. Thus, a board is produced with excellent flame spread and dimensional characteristics suitable for use as insulation in steel deck construction.

12 Claims, No Drawings

POLYISOCYANURATE FOAM LAMINATE AND PROCESS

BACKGROUND OF THE INVENTION

Polyisocyanurate foams have been used as a heat insulating layer in structural boards for applications such as fire doors, bulkheads and roofing boards for steel decks. In particular, steel deck roofs on structures such as shopping malls must be waterproof and insulated to conserve energy. The waterproofing and insulation must also be resistant to the spread of fire and should pass specifications such as the Class I designation of the Factory Mutual System of Norwood, Mass.

The polyisocyanurate polymer may be prepared by reacting a polyisocyanate, a polyol and other components such as an epoxide as set forth in U.S. Pat. Nos. 3,676,380, 3,799,896, 3,814,659, 3,909,346 and 3,940,517. As the reaction proceeds, applied heat causes the evaporation of an admixed blowing agent which results in the creation of the cellular framework of the foam.

However, prior polyisocyanurate processes and products have many disadvantages. For example, in some processes, the reaction mixture may require the application of a temperature of 150° to 200° F. which complicates the system and is wasteful of energy. Further, various processes necessarily require that the polyisocyanate be used in the form of its prepolymer reaction product with a diol. Additionally, some polyisocyanurate insulation boards, in order to pass safety standards, are required to be formed with web or sheet layers within the foam. Finally, reaction mixtures according to various prior procedures may be disadvantageous in that unacceptable amounts of reaction mixture must be discarded because the reaction fails to take place in the proper manner.

In view of the above, it is an object of the present invention to provide a polyisocyanurate process which requires the application of relatively low temperatures in order to promote the reaction and foam structure formation.

Another object of the invention is a polyisocyanurate foam insulating board with excellent structural integrity and precise dimensions.

A further object of the invention is a process for the production of a polyisocyanurate board where the board thickness may be maintained at an exact figure with consistent board density.

SUMMARY OF THE INVENTION

The above and other objects are achieved by mixing and subsequently depositing and reacting two polyisocyanurate reactants between two flexible sheet substrates and allowing the mixture to foam and push apart the two substrate. As the reaction proceeds, the outward movement of the laminate is restricted by barriers held apart at the desired thickness of the final product. The reaction may be completed in a short time with the application of a relatively low temperature and, in many cases, only ambient temperatures need be utilized.

DETAILED DESCRIPTION OF THE INVENTION

In order to form the polyisocyanurate foam, the following two components are admixed:

(a) a polyisocyanate, a surfactant and a blowing agent; and (b) a polyol component and an isocyanate trimerization catalyst component.

The polyisocyanate is preferably a polymethylene polyphenylisocyanate which is formed from two phenylisocyanate moieties separated by a methylene with the optional intermediary of one or more, preferably up to 8 phenylisocyanate methylene groups. Preferably the polyisocyanate is a mixture of these compounds having an amine equivalent of about 120 to 180. The amine equivalent is obtained by dividing 4200 by the weight percentage of —NCO moiety. Thus, it can be seen that the polyisocyanate preferably has a weight percentage of —NCO of about 23 to 35%.

Polyisocyanate mixtures which are used in the present invention preferably are fairly low in acidity and should have an acid number of less than 0.09, more preferably about 0.03 to 0.06. Thus, commercial polyisocyanates which are higher in acidity should be modified to this range or the amount of catalyst should be raised to compensate for high acidity.

Polyisocyanates which can be used in the present invention include the Mondur materials from Mobay Chemical Co. of Martinsville, W. VA., the PAPI materials from Upjohn Co. of Kalamazoo, Mich. and the Bayer polyisocyanates from Bayer of Liverkusen, Germany. Specific examples include Mondur MR having a viscosity of about 200±50 cps and an isocyanate functionality of 2.7. Mondur MR-200 has a viscosity of about 2,500±500 cps and a functionality of about 3.0 to 3.1 with 31% by weight —NCO. E-418 is a polyisocyanate made by Mobay which also performs well in the process of the present invention. PAPI-20, having an amine equivalent of about 140 and a functionality of 3.2, is an example of the PAPI materials which may be used. Bayer 1875 is a polyisocyanate prepolymer, i.e., wherein some polyol has already been reacted, having a 27% by weight —NCO content and an amine equivalent of about 155. These materials, alone or in combination, may be used as the polyisocyanate in the process of the invention.

In general, polyisocyanates described in U.S. Pat. Nos. 3,676,380, 3,799,896, 3,903,346 and 3,904,517, which are hereby incorporated by reference, may be used in the present invention.

The polyisocyanate may be used in an amount of about 70 to 80% by weight of the total weight of the starting materials.

The surfactant in component (a) is preferably a silicon-containing polymeric surfactant, more preferably one which is free of hydroxyl groups. Thus, the L-5340, L-5420 and L-5440 surfactants from Union Carbide Corporation have been found to give good results in accomplishing the surfactant purpose of controlling the cell structure in terms of regularity and fullness. The L series surfactants are generally polydimethylsiloxane polyoxyalkylene block copolymers. Further surfactant examples include LK-221 and LK-448 from Air Products and Chemicals Co. and DC-193 from Dow Corning. DC-193 possesses hydroxyl groups and since the (a) component of the invention is substantially free of hydroxyl groups, only low levels of this material should be used, if at all.

The surfactants utilized in the present invention may be used alone or in combination. Thus, it has been found that a 50/50 weight mixture of L-5340 and LK-221 gives excellent flow characteristics to the (a) component of the invention.

The surfactant may be used in an amount of about 0.1 to 5% by weight of the total starting material weight, preferably in about 1.0 to 2.5% by weight.

The blowing agent is preferably a liquid or solid which operates by evaporation or sublimation to produce the closed cell structure of the foam. Thus, liquids having a boiling point of about 70° to 100° F., preferably about 70° to 90° F., have been found useful. Examples include trichlorofluoromethane of the formula $CCl_3F$, trichlorotrifluoroethane of the formula $CCl_2FCClF_2$, methylene chloride and water. Included among the varied possible blowing agents are the Freon liquids obtained from DuPont of Wilmington, Del. and the Genetron materials from Allied Chemical Corporation of New York, N.Y. with boiling points within the desired range, e.g. Freon 11 and 113 and Genetron 11. These blowing agents may be in their stabilized form wherein a material such as a styrene monomer is added. As with all materials in the (a) component, the acidity of the blowing agent should be low. Preferably, the blowing agent should have a pH of about 6 to 8, more preferably about 7.0.

The utilization of trichlorofluoromethane, with a boiling point of about 74° F., has been found to give the foam of the invention excellent properties such as density and cell size. Further, with this liquid, the process for making the foam has desirable characteristics such as mixing and rising time and a low level of scrap, i.e. foams or laminates that do not conform to the desired specifications.

The blowing agent is used in an amount of about 14 to 18% by weight of all starting materials, preferably in an amount of about 15%. The quantity of the blowing agent will affect the density of the foam and, thus, that of the laminate board. In general, using 15% will yield a foam having a density of about 1.5 to 2.5 pounds per cubic foot.

The (a) component materials should preferably be admixed in a closed vessel. The order of addition is not particularly critical. Thus, one half by weight of the polyisocyanate may be added with gentle mixing, followed by all of the surfactant, the remaining polyisocyanate and the full amount of blowing agent, respectively. The mixing may be done at room temperature and thereafter until fed to the mixing head, the (a) component is kept at about 70° F., plus or minus 5° F. in order to maintain a consistent and predictable manufacturing schedule.

The (b) component of the invention comprises a polyol component and an isocyanate trimerization catalyst component. Preferably, each of these two components will comprise three separate materials. Thus, the polyol will preferably be a diol having a molecular weight less than about 150, a polyol having at least 3 hydroxyl groups and a polyethylene glycol having a molecular weight of at least 150. The catalyst will be an amine salt, a metal carboxylate and a dimethylaminomethyl-substituted phenol.

The diol having a molecular weight less than about 150 is exemplified by materials such as propylene glycol, 1,4-butanediol and diethylene glycol. All work well to give a foam product. However, it has been found that with diethylene glycol as the diol, a foam is obtained with excellent flame and stability characteristics. The diol material is used in an amount ranging from about 3 to 7% by weight of all starting materials, preferably about 4.75 to 5.5% by weight.

The polyol with 3 or more hydroxyl groups may be one such as a trialkanol amine, sucrose or sorbitol. Further, the polyol may be one based on a polyol but modified by reaction with an extender such as an epoxide. For example, THANOL RS-700, a sorbitol-based polyol with a hydroxyl number of 490 and obtained from Jefferson Chemical Company of Bellaire, Tex. 77401. Preferably, the polyol is a triol, more preferably the triol reaction product of an alkanol amine and a lower alkylene epoxide, most preferably the reaction product of triethanol amine and propylene oxide. An example of this material is THANOL SF-265 obtained from Jefferson Chemical Company. THANOL SF-265 has an amine content of 3.7 meq/g, a hydroxyl number of 630 and a viscosity at 25° C. of 430 cps. Other polyols which can be used are CP-260 and CP-270 from Dow Chemical. The polyol is used in an amount of about 0.1 to 3% by weight, preferably 0.75 to 1.25%, based on the total starting material weight.

The polyethylene glycol has a molecular weight of at least 150, and is preferably in the range of above 150 to 450 and most preferably about 200. As with other polymeric components, these molecular weights represent averages of the material as a whole. The 200 molecular weight polyethylene glycol has a hydroxyl number of about 560 to 565 and is exemplified by Carbowax 200 from Union Carbide, EE-200 from Dow Chemical or JEFFOX PEG-200 from Jefferson Chemical. The polyethylene glycol is used in an amount of about 3 to 6% by weight, preferably about 4.6 to 5.3% by weight, based on all starting materials.

The isocyanate trimerization catalyst component preferably firstly includes an amine salt, preferably a quaternary ammonium compound such as the DABCO TMR line of catalysts from Air Products and Chemicals of Allentown, Pa. Specific examples include DABCO TMR and DABCO TMR-2 which are amine salts, particularly quaternary ammonium compounds, suspended in a high boiling organic solvent such as a glycol. For example, DABCO TMR-2 is a liquid composition of the N-hydroxypropyl trimethyl ammonium salt of formic acid, which has a hydroxyl number of 685 in a glycol having an ammonia-like odor, a boiling point of about 250° F., a specific gravity of 1.055 at 25° C. and a pH in a 3% aqueous solution of about 6.5. The amine salt may be used in a catalytic amount. That is, as with many catalytic processes, the exact amount of catalyst will depend on the particular batch of starting materials, the room temperature at the time of reaction and the potency of the particular batch of catalyst utilized. Thus, small test samples of the foam should be prepared with new catalyst batches in order to adjust the amounts used in the scale-up to obtain a consistent product. Thus, it has been found that TMR-2 may be used in the process of the invention in an amount from 0.2 to 2.0 parts, preferably 0.3 to 0.8 parts, by weight based on 100 parts of the total of all starting material ingredients.

A second catalyst that may be used, preferably in addition to the amine salt catalyst, is a metal carboxylate. Examples include metal salts of aromatic carboxylic acids such as lead naphthoate and metal salts of aliphatic carboxylic acids such as potassium acetate. More specific examples include alkali metal salts of aliphatic monocarboxylic acids having up to 30 carbon atoms. Preferably, the metal salt is potassium 2-ethylhexoate, otherwise known as the octoate, which may be obtained as a mixture with a solvent carrier. Thus, the T-45 catalyst material sold by M & T Chemicals, Inc., of Rahway, N.J. is a 65% solution of potassium 2-ethylhexoate in polypropylene glycol having a 14% K content and a glycol hydroxyl number of 265 and may be used in the invention in an amount ranging from 0.01 to 1% by weight of all starting ingredients. Further, DM-9556 sold by M & T Chemicals, which is T-45 diluted with polypropylene glycol to 10% K, may be used. Other metal carboxylates include those of tin and a mixture of tin and potassium. Examples of these materials include the CNF line sold by M & T Chemicals. Specifically, CNF-576 has potassium and tin contents of 10.3% and 1.5% by weight, respectively. CNF-667 has potassium and tin contents of 6.9 and 7.8% by weight, respectively. Both of these have diluent carriers having hydroxyl numbers of 265. As with all catalysts used in the invention, the particular batch may vary in strength and concentration and thus should be tested before use to compare its characteristics to previous samples.

A third catalyst which may be used in conjunction with the two described above to constitute the catalytic component is a dimethylaminomethyl-substituted phenol based compound. Thus, the DMP line of catalysts sold by the Rohm and Haas Company of Philadelphia, Pa. are examples. Specific examples include DMP-10 and DMP-30 which is the Rohm and Haas brand of 2,4,6-tris(dimethylaminomethyl)phenol. The DMP-30 brand of dimethylaminomethyl phenol may be used in an amount of about 0.1 to 1.0%, preferably 0.3 to 0.38, by weight of all starting ingredients. However, since the catalyst manufacturer may vary the concentration of carrier or other aspects of the composition, this catalyst, as with all others, should be used in an amount best described as a catalytic amount determined by a test run with a scaled-down amount of each component.

The preferred six ingredients of the (b) component are admixed with gently agitation avoiding the occurence of turbidity which may be a sign of high acidity. It has surprisingly been found that turbidity may be consistently avoided by forming the (b) component by admixing the six ingredients in the order indicated above, i.e., diol with molecular weight less than about 150, polyol with at least three hydroxyls, polyethylene glycol, amine salt, metal carboxylate and dimethylaminomethyl-substituted phenol, respectively. The gradual addition of each may take place in an open or closed vessel at room temperature. Mixing is preferably done in a closed vessel and as with the (a) component, during subsequent transfer and storage the temperature is maintained at 70°±5° F.

Each batch of the (a) and (b) components prepared and thus the catalytic amount used should preferably be tested before fabrication of the foam. This is conveniently accomplished by measuring the "cream time" and "rim time" of the particular (a) and (b) component batches. The "cream time" is determined by drawing into a 32 ounce Lily number 36W polyethylene coated paper cup 200 grams of the desired (a) and (b) component. Utilizing the mixture of Example 1 described hereinafter, 174.746 grams of (a) component and 25.254 grams of (b) component will be drawn off at 70°±5° F. into a 36W Lily cup. The contents are then mixed at 2500 rpm and the time to "cream" is noted. When first mixed, a vortex will result but within a few seconds the mixture will foam and the vortex will disappear. This time is utilized as the "cream time". With the compositions of the invention, the "cream time" should be from about 15 to 20 seconds, preferably about 16 to 18 seconds.

The catalytic amount can further be checked by taking the cup and mixture immediately after determination of the "cream time" and then checking the "rim time". This is determined by placing a tongue depresser or any flat, light and rigid object on the rim of the 36W Lily cup and keeping the time running from the start of mixing for the "cream time". The "rim time" should be about 22 to 30 seconds, again at 70°±5° F., and is determined by the time at which the tongue depresser is dislodged from the rim and falls off the cup.

In addition to the nine preferred materials used for the foam of the invention, fillers or other additives may be used to convey characteristics such as dimensional stability, density or flame spread qualities. Specific examples include inorganic materials such as magnesium silicate, steel powder, aluminum silicate, borates, zinc oxide, aluminum powder or flakes or glass particles or fibers. These types of additives may be added to the (a) or (b) component or may be sprayed or deposited onto the reaction mixture before foaming takes place. Further, when a laminate is made from two flexible substrates with the (a) and (b) reaction mixture deposited therebetween, an open mat of an inorganic material such as a fiberglass mat, e.g. 10 to 50 mils in thickness, may be interposed between the substrates and the mixture will foam on either side of and within the mat. This may provide added strength and flame spread characteristics. However, it has surprisingly been found that boards made according to the invention with two substrates and foam therebetween need not have a fiberglass or other inorganic mat to possess excellent structural as well as flame spread characteristics.

Although the reaction mixture of the invention may be used to provide a polyisocyanurate foam as such, it is preferably deposited between two substrates, which may be inflexible such as drywall or flexible, and allowed to rise therebetween in order to produce a laminate board. The flexible substrate may be a kraft paper, a polymeric sheet, an asbestos or other inorganic fiber sheet, a polymeric web, a metal foil, a foil-coated paper, a resin-impregnated and saturated felt sheet, nonwoven glass mat which is asphalt-coated or -saturated. In particular, an asphalt-saturated organic felt having a weight of about 12 to 15 pounds per 100 square feet may be used. The substrates may be the same or different, e.g. if one side should have different capabilities than the other.

The board laminate may be formed on a double phase laminator provided with two parallel platen conveyor belts and a mixing head attached to a traverse and capable of rapid movement over a distance the width of the two belts. The platens of the belts may be 12 inch wide steel plates and the top surface of the bottom belt and the bottom surface of the top belt are set apart at the desired thickness of the board laminate. The driving gears of the two belts, moving in opposite circular directions, convey the two flexible substrates, supplied from rolls, through the laminator. A suitable parallel platen conveyor belt laminator is described in U.S. Pat. No. 4,043,719 although the limiting means to prevent outward escape of foam taught therein is not necessary in the present invention.

As the bottom flexible substrate is fed into the laminator there is deposited thereon a mixture of the (a) and (b) components after which the top surface of the deposited mixture is contacted with a doctoring roller and is then contacted with the top flexible substrate, also being fed into the laminator. The reaction mixture begins to form the foam and is restricted in its rise by the top and bottom platen conveyor belts, set at the desired board thickness. Preferably, there is provided on one or both of the belts a pressure sensing device which furnishes an indication when a predetermined pressure is reached. Thus, if the expansion of the reaction mixture is too great, a sensing device or devices may trigger a light whereupon the operator would decrease the amount of reaction mixture deposited per unit area. This may also be done automatically.

Mixing and deposition of the reaction mixture of components (a) and (b) may be made with a mixing head attached to a traverse located in front of the platen conveyor belts and across and above the bottom flexible sheet. Preferably, the mixing head moves from one side to another of the bottom sheet depositing the reaction mixture on the top face of the sheet as it moves from the roll of sheeting into the laminator. The traverse may be one such as a Leon traverse and the mixing head may be a model such as a Martin Sweets Model No. 4 sold by Martin Sweets Co. of Louisville, Ky. or a mixing head sold by the Admiral Machinery Co. division of Upjohn, Houston, Tex. or Henecke Machinery division of Mobay Chemicals. The mixing head should preferably move across the traverse at a speed of about 30 to 60 cycles per minute. Thus, if a four foot wide board is being produced, the mixing head would move at about 240 to 480 feet per minute. Air is supplied to the mixing head to deposit a homogenous and consistent reaction mixture and to act as a nucleating agent. Further, the mixing head may be provided with an automatic solvent flushing feature whereby the operation can be shut down without clogging the apparatus. To the mixing head is supplied from separate lines components (a) and (b) which can advantageously be prepared and stored for extended periods beforehand.

Temperatures needed to obtain the foam of the present invention are surprisingly low. That is, compared to required temperatures of 150° to 200° F. in some prior polyisocyanurate processes, those of the invention will be below about 140° F. preferably from about 60 to less than about 140° F. and most preferably about 75° to 90° F. The particular temperature will depend on the thickness of the foam. Thus, at a board thickness of about one inch, the reaction mixture should preferably be heated with a medium, e.g. hot air, at about 138° F. With increasing thickness, the applied temperature needed diminishes and at a board thickness of about three inches, the platens of the laminator need only be preheated to about 138° F. and after beginning the process, no applied heat is required. In contrast, a reaction mixture for a board about 3.4 inches in thickness can simply be deposited and maintained at room temperature, e.g. about 60° to 100° F., without any heating. At about four inches, the reaction mixture for the board should preferably be cooled in order to maintain it at a normal room temperature if the actual room temperature is high.

The residence time of the laminate through the laminator will preferably be about 1 to 3 minutes, more preferably about 1.25 to 2.0 minutes.

It can be appreciated that the process of the invention allows unique advantages including the relatively low applied temperature needed, a fast rise time, the use of only two vats and feed lines for all components and the absence of a need for epoxy in the mixture. Further, it has surprisingly been found that the foam exhibits a low degree of friability and adherence of the substrates to the foam is very high, allowing the production of an integral board which resists peeling and separation of the covering.

As the laminate progresses through the laminator and between the platen conveyors, the foaming action causes the thickness to increase by about 30 to 40 times until both outer faces of the board are in contact with the platens of the conveyor. As indicated above, the conveyor may be provided with pressure sensing means whereby at a particular pressure, e.g. 5 pounds per square inch a signal may be given and the operator can lower the amount of reaction mixture deposited per square inch, e.g. by lowering the flow rate from the mixing head or by increasing its speed on the traverse.

After the reaction mixture foaming is substantially or fully complete, the board laminate may be trimmed to the desired exact width and as it exits from the laminator, it may simply be cut with a cross-cut saw to the proper length.

The following examples demonstrate the process and product of the present invention.

EXAMPLE 1

The (a) portion of the reaction mixture for the polyisocyanurate foam of the invention was prepared by gentle mixing of the following ingredients in a closed vat:

|   |   | Parts by Weight |
|---|---|---|
| 1. | Polyisocyanate (Mondur MR-200) | 71.210 |
| 2. | Surfactant (L-5340) | 1.144 |
| 3. | Blowing Agent (G-22-SBA(stabilized)) | 15.019 |
|   | TOTAL: | 87.373 |

The (b) portion of the reaction mixtures was formulated by adding, in the order set forth below, the following substances to a mixing vessel with gentle mixing:

|   |   | Parts by Weight |
|---|---|---|
| Polyols |   |   |
| 4. | Diethylene glycol anhydrous | 5.366 |
| 5. | Triol (SF-265) | 0.947 |
| 6. | Diol (EE-200) | 5.262 |
| Catalysts |   |   |
| 7. | Amine salt (TMR-2) | 0.530 |
| 8. | Metal carboxylate (T-45) | 0.127 |
| 9. | dimethylaminomethyl phenol (DMP-30) | 0.395 |
|   | TOTAL: | 12.627 |

The amounts of the polyisocyanates and polyols shown above reflect adherence to a desired NCO/OH functionality ratio. This ratio is about 3:1 to about 4:1 for the foams of the invention. In this Example, the NCO/OH ratio was 3.6:1.

The (a) and (b) components are delivered to and mixed in a Martin Sweets #4 mixing head which is mounted on a traverse exending across a section of an asphalt-saturated organic felt from having a weight of about 13 pounds per 100 square feet. The felt is extended from a roll of felt to and through a double phase laminator apparatus having upper and lower conveyor belts of twelve inch steel platens. Also going into the laminator is a second section of asphalt impregnated organic felt of the same weight. The roll of the first felt is disposed substantially horizontally to the space between the two conveyor belts of the laminator. The roll of the second felt is located just above the entrance to the space between the belts. Thus, the first felt, on which the reaction mixture is deposited is horizontal throughout the process after being unrolled while the second felt after being unrolled travels downward until it reaches belts where it meets the reaction mixture disposed on the first felt. A doctor roller is provided above the top felt before it enters the apparatus. This roller evens out the reaction mixture between the top and bottom facings and to effect a homogeneous board.

The platen conveyor belts are adjusted to form a spacing about 2.5 inches high and this will correspond to the final product thickness. The apparatus is preheated to 120° and is simply left throughout the process at ambient temperature. The apparatus is provided with pressure sensor lights on the conveyor belt mounts which are lit when the pressure from the extending foam reaches about 5 pounds per square inch. When this pressure is exceeded, the amount of reaction mixture deposited is reduced.

At the exit portion of the two opposed platen conveyor belts two edge saws operate to trim the foam board while a reciprocating cross-cut saw sizes the board into individual panels. The residence time of the laminate through the laminator was about 2 minutes. The panels have a density of about 2 pounds per cubic foot, exhibit low or no friability and are dimensionally stable and strong. Further, the panel exhibited excellent resistance to flammability according to the ASTM E-84 flame spread testing apparatus and achieved a rating of 20 at low smoke emission.

EXAMPLE 2

The apparatus and materials described in Example 1 were used with the exceptions that the conveyor belts were preheated with hot air at 138° F. and were set 1.4 inches apart and the (a) and (b) components were formulated as follows:

| | | Parts by Weight |
|---|---|---|
| 1. | Polyisocyanate (Mondur MR-200) | 72.128 |
| 2. | Surfactant (L-5340) | 1.159 |
| 3. | Blowing Agent (G-11-SBA(stabilized)) | 15.213 |
| | TOTAL: | 88.500 |

The (b) portion of the reaction mixture was formulated by adding, in the order set forth below, the following substances to a mixing vessel with gentle mixing:

| | | Parts by Weight |
|---|---|---|
| Polyols | | |
| 4. | Diethylene glycol, anhydrous | 4.887 |
| 5. | Triol (SF-265) | 0.863 |
| 6. | Diol (EE-200) | 4.793 |

| | | Parts by Weight |
|---|---|---|
| -continued | | |
| Catalysts | | |
| 7. | Amine salt (TMR-2) | 0.483 |
| 8. | Metal carboxylate (T-45) | 0.115 |
| 9. | Dimethylaminomethyl phenol (DMP-30) | 0.359 |
| | TOTAL | 11.500 |

Throughout the operation of the double phase laminator, the platens were kept at about 138° F. by a stream of forced hot air. The panels were cut into width of 4 feet, had a density of about 2 pounds per cubic foot and performed well in the ASTM E-84 flame spread test.

While the invention has been described in terms of specific materials and examples, it is to be understood that one skilled in the art recognizes various modifications that may be made still keeping within the spirit and scope of the invention.

What is claimed is:

1. In a process for producing a polyisocyanurate foam laminate comprising mixing polyisocyanate, surfactant, blowing agent, polyol and isocyanate trimerization catalyst components to form a reaction mixture, feeding said reaction mixture between two flexible sheet substrates defining a reaction zone, and reacting and foaming said mixture to form together with said substrates said polyisocyanurate foam laminate, the improvement which comprises:
   conducting said reaction at a temperature less than about 140° F.

2. The process of claim 1 comprising, in addition, the steps of sensing the pressure exerted by the reaction mixture on at least one of said substrates as the foam is formed, and controlling the feeding of said reaction mixture to said reaction zone to maintain a substantially constant pressure therein during said reaction.

3. The process of claim 2 wherein the reaction temperature is from about 60° F. to less than about 140° F.

4. The process of claim 3 wherein the reaction temperature is controlled in accordance with the thickness of the foam to be formed.

5. The process of claim 4 wherein the reaction temperature is from about 75° F. to about 90° F.

6. The process of claim 1, 2, 3, 4 or 5 wherein the pressure is maintained at about 5 lbs./in.$^2$.

7. The process of claim 2 wherein said components are
   (i) a polymethylene polyphenylisocyanate;
   (ii) a silicon-containing polymeric surfactant free of hydroxyl groups; and
   (iii) a liquid blowing agent having a boiling point less than about 140° F.
   (iv) a diol having a molecular weight less than about 150;
   (v) a polyol having at least 3 hydroxyl groups;
   (vi) a polyethylene glycol having a molecular weight of at least 150;
   (vii) an amine salt;
   (viii) a metal carboxylate; and
   (ix) a dimethyl aminomethyl-substituted phenol,
   wherein the reaction temperature is from about 60° F. to less than about 140° F.

8. The process of claim 7 wherein the pressure is maintained at about 5 lbs./in.$^2$.

9. The process of claim 7 wherein the components are:
- (i) a polymethylene polyphenylisocyanate having an NCO content of about 23 to 35% by weight;
- (ii) a polydimethylsiloxane polyoxyalkylene block copolymer surfactant; and
- (iii) a liquid blowing agent having a boiling point from about 70° to 90° F.
- (iv) diethylene glycol;
- (v) a triol product of a trialkanol amine and propylene oxide;
- (vi) a polyethylene glycol having a molecular weight of about 150 to 450;
- (vii) a quaternary ammonium salt;
- (viii) a potassium salt of an aliphatic monocarboxylic acid; and
- (ix) 2,4,6-tris(dimethylaminomethyl)phenol, and wherein the reaction temperature is from about 75° F. to about 90° F.

10. The process of claim 9 wherein the pressure is maintained at about 5 lbs./in.$^2$.

11. The laminate produced by the process of claim 7.

12. The laminate produced by the process of claim 9.